May 19, 1970            W. L. AMMANN            3,512,550

FLUID PRESSURE CONTROLLED VALVE

Filed March 11, 1968            2 Sheets-Sheet 1

INVENTOR.
WILLIAM L. AMMANN
BY
Robert E. Brightmith
ATTORNEY

May 19, 1970 W. L. AMMANN 3,512,550

FLUID PRESSURE CONTROLLED VALVE

Filed March 11, 1968 2 Sheets-Sheet 2

INVENTOR.
WILLIAM L. AMMANN
BY
Robert E Breidenthal
ATTORNEY

United States Patent Office 3,512,550
Patented May 19, 1970

3,512,550
FLUID PRESSURE CONTROLLED VALVE
William L. Ammann, Argonia, Kans. 67004
Continuation-in-part of application Ser. No. 566,996,
July 21, 1966. This application Mar. 11, 1968, Ser.
No. 711,995
Int. Cl. F16k 37/00, 31/363, 31/365
U.S. Cl. 137—553                    7 Claims

ABSTRACT OF THE DISCLOSURE

A normally closed fluid pressure controlled valve such as to be opened to a progressively greater extent upon the application of progressively greater fluid control pressure thereto. The opening of the valve by fluid pressure is opposed by spring means, and finely calibrated stop means is provided for adjustably limiting the extent to which control fluid pressure can open the valve. In one form of the valve the pressure control chamber is partially defined by a piston fixed to the valve stem. In another form of the invention the chamber is defined between a pair of diaphragms, with one of said diaphragms separating the chamber from the passageway for the valved fluid.

---

This application is a continuation-in-part of my pending original application, Ser. No. 566,966, filed July 21, 1966, and entitled Soil Treating Apparatus (now U.S. Pat. No. 3,372,658), and this application is also a continuation in part of my recently filed divisional application of said original application, such divisional application being entitled Soil Treatment With Liquid Anhydrous Ammonia and having a filing date of on or about Mar. 8, 1968.

The present invention pertains to new and useful improvements in fluid pressure controlled valves, and more particularly pertains to valves of such charatcer that are normally closed and which will with an increase in fluid control pressure afford a smoothly varying degree of opening of the valve. More specifically, this invention additionally involves the provision of finely calibrated means for adjustably limiting the maximum opening of the valve.

A paramount objective of the present invention is to provide a normally closed fluid pressure controlled valve suitable for use in many environments and for valving different kinds of fluid, both liquid and gaseous, and which will be well suited for use in apparatus such as disclosed in my copending original application, Ser. No. 566,996, filed July 21, 1966 and entitled Soil Treating Apparatus.

Another important object of the present invention is to provide a fluid pressure controlled valve which will include a pair of ports adapted to be connected to the adjacent ends of segments of a fluid pressure control conduit whereby pressure and fluid communication is established between such segments through a fluid pressure control chamber within the valve.

Still another very important object of the invention is to provide a valve highly resistant to becoming inoperative due to deposit of gum or the like within the valve when the same is employed in conjunction with fluids having a propensity to deposit gum or the like, such as for example anhydrous liquid ammonia having dissolved solids or dissolved viscous liquids therein.

Still another important object of the invention is to provide a valve of the character specified above which will include provision for a very fine adjustment as to the maximum extent that the valve can be opened, and preferably such a fine adjustment means which includes readily readable indicia as to the adjustment.

A broad aspect of the invention involves a fluid pressure controlled valve comprising a valve body having a generally L-shaped fluid passageway therethrough that is partially defined by an annular valve seat, said passageway being for valved flow of fluid therethrough, an elongated valve stem axially aligned with the valve seat and having one end adjacent the valve seat, said one end of the valve stem being provided with a valving element that is sealingly engageable with the valve seat to close the valve on movement of the valve stem in a forward direction toward said one end thereof to a predetermined position, said valving element including a tapered portion projecting into the valve seat whereby the passageway is progressively closed as the valve stem progressively moves toward said predetermined position, said body having a control fluid chamber therein, means for preventing fluid communication between the passageway and said chamber, means connected to the valve stem responsive to fluid pressure within the chamber to exert a force upon the valve stem urging movement thereof in a rearward direction with the force that increases in magnitude in response to an increase in pressure in the chamber, spring means yieldingly urging movement of the valve stem in said one direction, and said valve body having a port therein communicating with the chamber for enabling connection of the valve body to a fluid control pressure conduit.

Another broad aspect of the invention involves a valve of the character set forth in the preceding paragraph additionally involves a threaded stop member threaded through the valve body in alignment with the valve stem and having one end disposed in the travel path of the valve stem to positively and adjustably limit the maximum extent to which the valve can be opened by fluid control pressure.

Another broad aspect of the invention involves a valve such as specified in the penultimate paragraph wherein the means for preventing fluid communication between the passageway and the chamber comprises a movable diaphragm having a relatively movable central portion, said diaphragm separating the chamber and the passageway and having a periphery fixed sealingly to the valve body, said valve stem extending through the central portion and being in fixed sealing engagement therewith.

Another broad aspect of the invention involves a valve such as set forth in the preceding paragraph wherein the means connected to the valve stem responsive to fluid pressure within the chamber to exert a force upon the valve comprises a second diaphragm having a relatively movable central portion, said second diaphragm having a periphery fixed sealingly to the valve body to partially define said chamber, and the valve stem being fixed to the central portion of the second diaphragm, said first mentioned diaphragm and the second diaphragm respectively presenting relatively smaller and greater effective areas to the action of fluid pressure prevailing in the chamber.

Other important objects and aspects of the invention will clearly manifest themselves during the ensuing description of preferred embodiments of the invention, such description to be taken in conjunction with the accompanying drawings, wherein.

Figure 4:
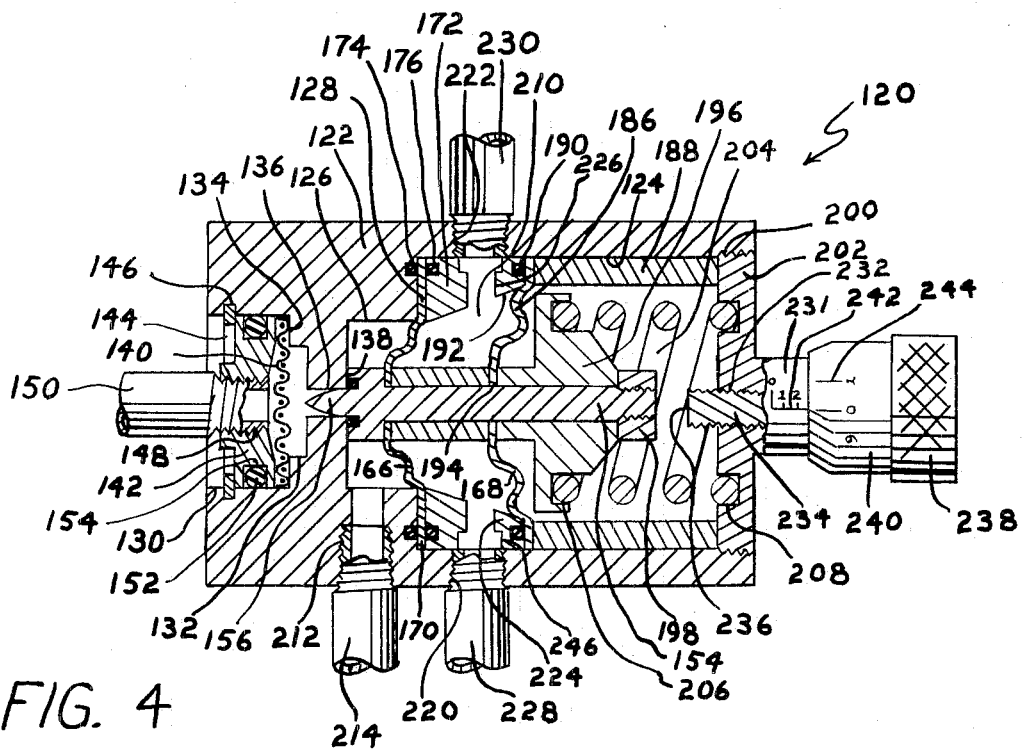
FIG. 4 is an enlarged central sectional view of another embodiment of a fluid pressure controlled valve according to the invention.
Figure 5:
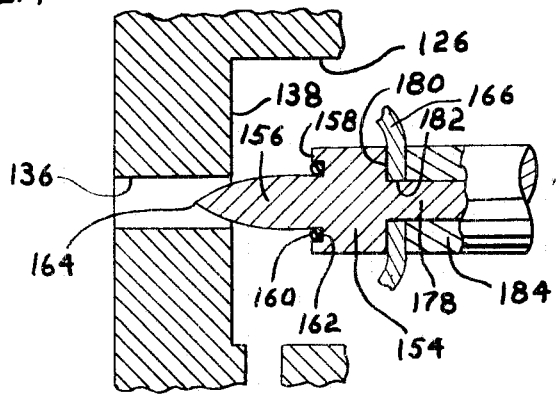
Figure 6:
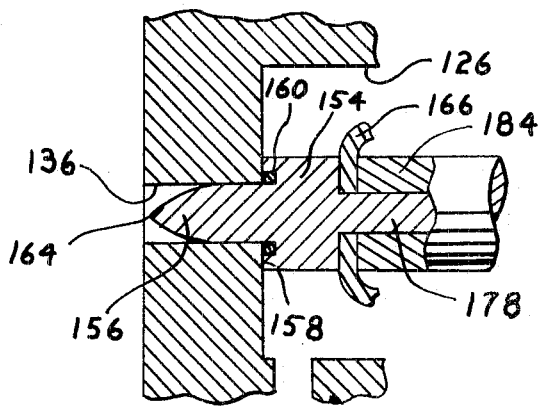

FIG. 5 pertains to the embodiment of the invention shown in FIG. 4 and is an enlarged fragmentary detail view of the valving element and its associated valve seat, this view showing the valving element in an open position; and FIG. 6 also pertains to the embodiment of the invention shown in FIG. 4 and is a view similar to FIG. 5, but showing the valving element in valve closing position.

Figure 1:
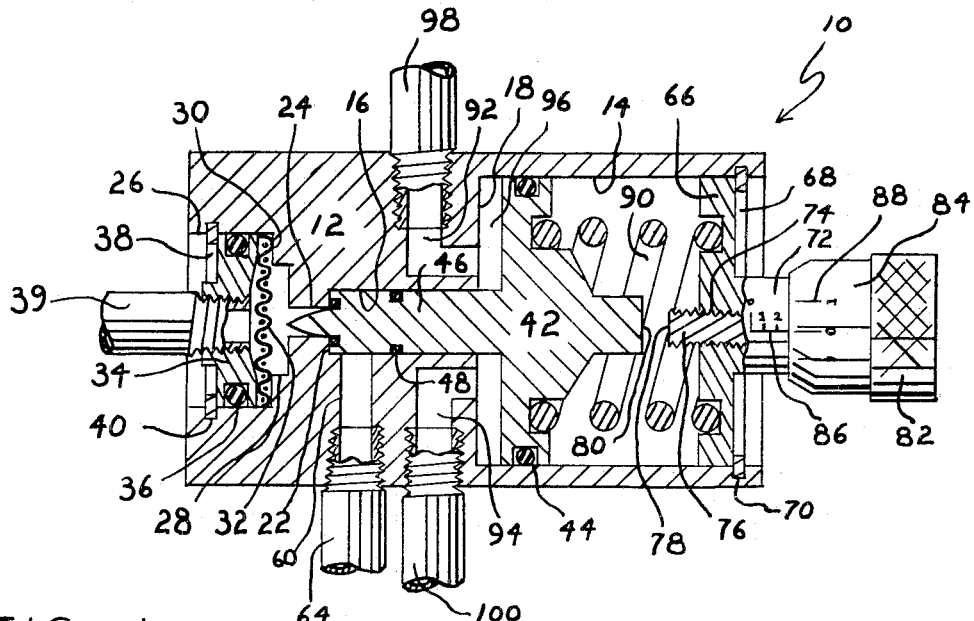
FIG. 1 is an enlarged central sectional view of a fluid pressure controlled valve according to the invention.
Figure 2:
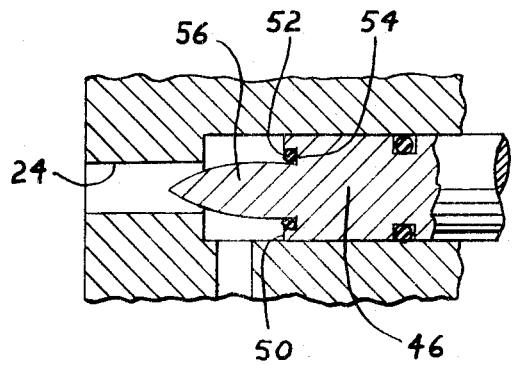
FIG. 2 is an enlarged fragmentary detail view of the valving element and its associated valve seat, this view showing the valving element in an open position.
Figure 3:
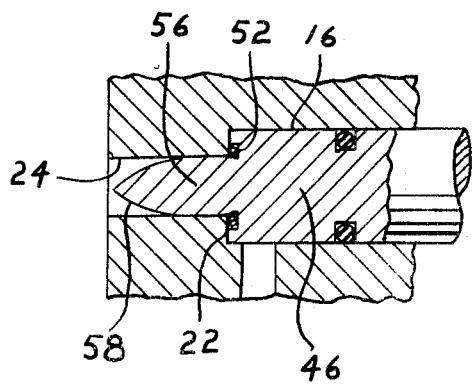
FIG. 3 is a view smiliar to FIG. 2, but showing the valving element in valve closing position.

Referring now to the drawing, wherein like numerals designate like parts throughout the various views, and directing attention initially to the embodiment of the invention shown in FIGS. 1, 2 and 3, the reference numeral 10 designate the fluid pressure controlled valve generally. The valve 10 comprises a valve body 12 having an enlarged bore 13 in one end thereof, and such cylindrical bore 14 is in axial alignment with a smaller cylindrical opening 16 that terminates at its end remote from the inner end 18 of the bore 14 at an annular valve seat 22 defined at the juncture of the opening 16 with a yet smaller and axially aligned opening 24.

The end of the valve body 12 remote from the outer end of the bore 14 is provided with a cylindrical recess 26 that is in axial alignment with the bore 14, the opening 16, the valve seat 22 and the opening 12. The recess 26 has communication with the opening 24 by means of an opening 28 coaxial with the opening 24 and having a diameter intermediate that of the opening 24 and the recess 26. The arrangement is such that a shoulder 30 is defined at the juncture of the recess 26 and the opening 28, and a filter screen 32 is disposed within the recess 26 and seated against such annular shoulder 30. An annular coupling member 34 is disposed within the recess 26 and has sealing engagement with the lateral confines of the latter by means of an O-ring seal 36 provided in the periphery of the annular coupling member 34. The coupling member 34 is retained in the recess 26 in a position abutting the screen 32 by means of a conventional C-shaped retaining ring 38 of resilient character that is removably received within an annular groove 40. The member 34 is internally threaded as shown, and a conduit 39 has a threaded end threadingly fitted into the annular coupling member 34, as clearly shown.

A piston 42 is slidingly and sealingly fitted within the bore 14, an O-ring seal 44 being provided about the periphery of the piston 42 to assure such seal. Fixed to and preferably integral with the piston 42 is a valve stem 46 that is slidingly and sealingly extended through the opening 16 toward the annular valve seat 22 as shown, and in order to assure a fluid-tight seal between the valve stem 46 and the sides of the opening 16, an O-ring 48 is preferably provided about the valve stem 46, as shown. The end of the valve stem 46 remote from the piston 42 constitutes a valving element comprised of an annular shoulder 50 in which an O-ring seal 52 is seated within an annular groove 54 provided therefor. As clearly shown in FIG. 3, movement of the valve stem 46 to the left in the opening 16 serves to seat the O-ring 52 against the annular valve seat 22 to positively prevent any flow of fluid through the cylindrical opening 24. The valving element also includes a reduced end portion 56 of circular transverse section that is tapered in diameter from the valve stem 46 as indicated at 58. Preferably, such taper 58 progressively increases from the valve stem 46; however, the taper 58 can be linear, if desired. In the preferred construction, the projection 56 has a diameter at its major end substantially equal to the internal diameter of the opening 22, and thus augments the sealing effect obtained by the O-ring 52. A lateral opening 60 is provided which communicates between the opening 16 and the exterior of the valve body 12, and such opening 60 is internally threaded for threaded connection to a conduit 64.

From the foregoing, it will be seen that the openings 24 and 60 together with a portion of the extent of the opening 16 constitutes an L-shaped passageway through the valve body 12 and a path of communication between the conduits 64 and 39 that is controlled by the valving element comprised of the sealing ring 52 and the tapered projection 56 that projects into the opening 24. The arrangement is such that when the valve stem 46 is in the position shown in FIG. 3, the valve 10 is closed so as to shut off entirely fluid communication between the conduits 64 and 39, with such fluid communication becoming increased progressively upon movement of the valve stem 46 to the right as viewed in FIGS. 2 and 3. In other words, a very short or small degree of movement of the valve stem 46 to the right will permit for a given pressure differential a very small flow of fluid between the conduits 64 and 39, and for such given pressure differential progressively moving the valve stem 46 to the right will result in a progressively increasing rate of flow as between the conduits 64 and 39. Thus, the degree of valve opening or fluid communication between the conduits 64 and 39 is a function of the extent to which the valve stem 46 and the piston 42 are moved to the right as seen in FIGS. 1, 2 and 3.

Adjustable means is provided for positively limiting the extent to which the valve stem 46 and the piston 42 can be moved to the right, and for an appreciation of such means, attention is directed to FIG. 1, wherein it will be seen that a circular plate 66 is received within the outer end of the bore 14, and it should be noted that while the plate 66 fits fairly snugly within the bore 14 it is not necessary, and in fact it is preferred that such contact not be fluid tight. The plate 66 is secured against outward movement from within the bore 14 by means of a resilient C-shaped retaining springs 68 that is removably seated within an annular groove 70 as shown. The plate 66 is provided with a central boss 72 that extends outwardly from the confines of the bore 14, and the plate 66 and its integral boss 72 are provided with an axially extending internally threaded opening 74 therethrough. A threaded stop member 76 is threaded through the opening 74 to project toward the piston 42 from the plate 66. The inner end 78 of the stop member 76 is disposed directly in the travel path of a central boss 80 carried by the piston 42, the arrangement being such that movement of the valve stem 46 to the right as shown in FIG. 1 is positively limited to such a position in which the boss 80 of the piston 42 abuts the inner end 78 of the stop member 76. Such limiting position is of course adjustable by means of threading the stop member 76 through the plate 66 towards and away from the piston 42. In order to calibrate and precisely adjust the axial position of the stop member 76, the outer end of the stop member 76 is enlarged to constitute a knurled turning knob 82, and the turning knob 82 is provided with a sleeve or skirt 84 that extends toward the plate 66 and which rotatably embraces the boss 72. The boss is provided with axially extending indicia 82, and the sleeve 84 is provided with circumferentially extending indicia 88 in an arrangement such that the extent of exposure of the axial indicia 82 by the sleeve 84 taken in conjunction with the relationship of the indicia 88 as to its angular position with respect to the indicia 82 enables the position of the stop member 76 to be accurately indicated.

A coiled compression spring 90 is disposed within the bore 14 and biased between the piston 42 and the plate 66 so as to resiliently and yieldingly urge the valve stem 46 to the left as seen in FIGS. 1, 2 and 3, whereby the valve 10 is normally fully closed.

Pressure responsive means is provided for opening the valve 10 to the extent that such opening is limited by the stop member 76, such means comprising the provision of passageways 92 and 94 in the valve body 12 which communicate between an annular chamber 96 within the bore 14 and the exterior of the valve body 12, such passageways 92 and 94 being respectively coupled by threaded connection to conduits 98 and 100. It will be evident upon inspection of FIG. 1 that whenever a pressure of sufficient magnitude prevails within the conduits 98 and 100, such pressure is communicated to the chamber 96 and therefore acts upon the piston 42 to move such piston and the valve stem 46 to the right against the bias of the spring 90 until further movement is prevented by the stop member 76. It is to be noted that the pressure prevailing within the conduit 98 is communicated to the conduit 100 via the passageway 92, the chamber 96, and the passageway 94. The importance of the latter consideration resides in the fact that providing each valve with two passageways or ports communicating with the piston chamber enables a plurality of valves to be connected in series to a source of fluid pressure with a plug provided in one of the ports of the last valve of the series with the result of pressure applied from a single conduit serving to actuate the pistons of all the valves in unison and therefore open all the valves at one time, and similarly release of pressure from any one of such chambers results in venting the system and consequent closure in unison of all the valves by the action of the springs therein.

It will be understood that the valve 10 may be opened to an extent intermediate being fully closed and opened to the extent permitted by the adjustable stop means, this control being afforded by applying a pressure to the piston or pressure control chamber sufficient to accomplish the desired degree of opening.

Attention is now directed to the embodiment of the invention shown in FIGS. 4, 5 and 6. This embodiment of the valve is designated generally at 120, the same comprising a valve body 122 having an enlarged cylindrical bore 124 in one end thereof. Axially aligned with the bore 124 and constituting a reduced cylindrical extension of the bore 124 is a lesser bore 126 with an annular shoulder 128 being defined at the juncture of the bores 124 and 126.

The other end of the valve body 122 is provided with a cylindrical bore 130 aligned with the bores 124 and 126, the bore 130 being of approximately the same diameter at the bore 126. Axially aligned with and constituting a reduced extension of the bore 130 is a lesser bore 132, there being defined at the juncture of the bores 130 and 132 a shoulder 134.

A reduced diameter cylindrical passageway 136 is aligned with and provides communication between the interiors of the bores 126 and 132. The structure thus far defined is such as to define an annular valve seat 138 at the inner end of the bore 126 that extends about the periphery of the passageway 136.

A circular screen 140 is disposed within the inner end of the bore 130 and is seated against the annular shoulder 134. A coupling member 142 is disposed within the bore 130 so as to retain the screen 140 in position, the coupling member 132 being in turn releasably retained in the bore 130 by means of a conventional C-shaped spring steel retaining ring 144 that is removably seated in an annular groove 146.

The coupling member 142 is provided with an internally threaded opening 148 therethrough into which is threaded the threaded end of an outlet conduit 150. The coupling member 142 is provided with means for preventing fluid leakage between its periphery and the valve body 122, such means taking the form of an O-ring 152 in sealing engagement with the wall of the bore 130, such O-ring 152 being received in an annular groove 154 about the periphery of the coupling member 142.

An elongated valve stem 156 is disposed within the valve body 122, the valve stem 154 being coaxial with and within the bores 124 and 126, and including a reduced tapered end portion 156 that projects into the circular passageway 136. The tapered end portion 156 is relatively reduced in diameter with respect to that portion of the valve stem 154 to which it adjoins as an integral part, the arrangement being such that a shoulder 158 is defined that seats against the valve seat 138 when the valve 120 is closed. In the preferred construction, the annular shoulder 158 is provided with an annular resilient sealing element 160 that is retained in an annular groove 162 in the shoulder 158. The function of the resilient annular sealing element 160, which protrudes slightly from within the groove 162 is to sealingly seat against the annular valve seat 138 when the valve stem 154 is in a position closing the valve 120 as shown in FIGS. 4 and 6.

The protruding end portion 156 of the valve stem 154 is circular in cross section and has a major diameter at its juncture with the shoulder 158 only slightly less than the diameter of the circular cylindrical opening 136 and is preferably such as to afford just free operating clearance in the opening 136. From its juncture with the annular shoulder 158, the projecting end portion 156 of the valve stem 154 is smoothly and very gently tapered in diameter as shown, with such taper progressively increasing toward the free end 164 of the projecting 156. The relationship is such that upon equal increments of movement of the valve stem 154 to the right from valve closing position shown in FIG. 6, the annular clearance of the projection 156 in the cylindrical opening 136 progressively increases at a progressively increasing rate with the amount of clearance increase being particularly minute during the initial stages of movement of the valve stem 154 to the right. It will be noted that the axial length of the projecting end portion 156 approximates the axial spacing of the bores 126 with the results that the valve stem 154 must be moved an extent to the right approximating the spacing of the bores 126 and 132 to fully open the valve from its closed position.

It will be appreciated by those skilled in the art that the taper of the projecting portion 156 and the length of the projecting portion 156 in relation thereto can be varied as desired to obtain any desired dependency of clearance of the projecting portion 156 and the opening 136 as a function of displacement of the valve stem 154 to the right. Notwithstanding such freedom of design insofar as the shape of the projecting portion 156 is concerned, it is preferred that the projecting portion 156 provide the previously described relationship of clearance to displacement of the valve stem 154 so as to afford the precision type of adjustable control over the maximum degree of valve opening or amount of clearance as will be subsequently described in connection with this embodiment of the invention.

Means is provided to maintain the valve stem 154 coaxial with the bore 124 and therefore in alignment with the axis of the circular cylindrical opening 136, while permitting axial movement of the valve stem 154. The means provided for this purpose also serves the function of urging forcible movement of the valve stem 154 to the right in response to the application of a fluid control pressure.

The means specified in the preceding paragraph comprises a pair of diaphragms 166 and 168. The diaphragm 166 has a peripheral marginal portion 170 thereof seated against the annular shoulder 128 and is retained in such position by an annular member 172 slidably fitted in to the inner end of the bore 124 as shown. The peripheral margin 170 of the diaphragm 166 is sealed by O-rings 174 and 176 disposed on opposite sides thereof and respectively seated in annular grooves in the shoulder 128 and the annular member 172 as shown.

The rear portion 178 of the valve stem 154 is relatively reduced in diameter to define an annular shoulder 180. The diaphragm 166 is provided with a central opening 182 through which the portion 178 of the valve stem 154 extends. The central portion of the diaphragm 166 is seated against the annular shoulder 180 and is firmly retained in such position by means of a sleeve 184 slidably embracing the valve stem portion 178.

The outer peripheral margin 186 of the diaphragm 168 is seated against the axially opposite end of the annular member 172 from the peripheral marginal portion 170 of the diaphragm 166 and is retained in such position by a sleeve 188 slidably received within the bore 124 as shown.

An O-ring 190 is seated in an annular groove in the annular member 172 as shown for effecting a seal with the diaphragm 168, as shown.

It will be noted on inspection of FIG. 4 that the internal surface of the annular member 190 is of frusto-conical configuration so as to have a minor internal diameter at its juncture with the diaphragm 166 equal to the diameter of the bore 126, and a major diameter equal to the diameter of the bore 124 less the wall thickness of the sleeve 188. The arrangement is such that the diameter of the diaphragm 166 inward from its position of engagement with the annular member 172 is substantially less than the diameter of the diaphragm 168 inward from its engagement with the annular member 172, and the reason for such difference in diameters of the free radially inward extent of the diaphragms will be explained presently.

As in the case of the diaphragm 166, the diaphragm 168 is provided with a central opening 194 through which the valve stem portion 178 extends, with the central portion of the diaphragm 168 being engaged between the rearmost end of the sleeve 184 and an annular spring seat element 196 that is slidable upon the valve stem portion 178 as shown. The rearmost end of the reduced valve stem portion 178 has a nut 198 threaded thereon that bears against the spring seat member 196 to urge the latter forwardly. The arrangement is such that the innermost portions of the diaphragms 166 and 168 as well as the sleeve 184 and the spring seat element 196 are all tightly and sealingly clamped between the valve stem shoulder 180 and the nut 198.

A portion of the outer extent of the bore 124 is internally threaded as indicated at 200, and a separable portion of the valve body 122 in the form of a circular end wall 202 is threaded snugly into the threaded portion 200 of the bore 124 so that the valve body wall 202 bears tightly against the end of the sleeve 188 opposite from the annular member 172, the arrangement being such that the outer peripheral margins of the diaphragms 166 and 168 as well as the annular member 122 and the sleeve 188 are tightly clamped between the valve body wall 202 and the internal shoulder 128. It is not essential that the threaded connection 200 between the wall 202 and the remainder of the valve body 122 be fluid tight, but only that the desired clamping action is obtained. In fact, it is preferred that such connection not be fluid tight, and if desired, it is to be understood that a vent opening, not shown, can be provided through the valve body wall 202.

A coiled compression spring 204 is disposed in spaced relationship within the sleeve 188, such spring 204 being under resilient compression and seated against adjacent faces of the spring seat element 196 and the valve body wall 202, such spring 204 preferably having its opposite ends seated in annular retaining grooves 206 and 208 as shown. The arrangement is such that the spring 204 yieldingly urges the valve stem 154 to the left as shown in the drawings, and the spring is biased so that such a force is exerted even when the valve 120 is closed as shown in the FIGS. 4 and 6.

It will be appreciated that a control pressure chamber 210 is defined within the valve 120, such chamber 210 being of annular configuration and defined by the internal frusto-conical surface 192 of the annular member 172, the adjacent sides of the diaphragms 166 and 168, and the external surface of the sleeve 184. The valve body 122 is provided with an internally threaded port 212 opening into the bore 126, and a conduit 214 is threaded into such port 212. The internally threaded port 212 in conjunction with the bore 126, the circular opening 136, the bore 132, and the opening 148 define an L-shaped passageway through the valve body 122 affording communication between the conduit 214 and the conduit 150 subject to the control of the valving elements 160 and 156. It will be understood upon inspection of FIG. 4 that the diaphragm 166 separates the chamber 210 from the L-shaped passageway described.

The diaphragms 166 and 168 each have radial extents intermediate their junctures with the annular member 172 and their junctures with the sleeve 184, and in view of the previous comments regarding the internal configuration of the annular member 172 and in further view of the fact that the sleeve 184 is cylindrical, the free radial extent of the diaphragm 168 is substantially greater than the free radial extent of the diaphragm 166, the essential characteristic being that the axial area projection of the free extent of the diaphgram 168 is substantially greater than the corresponding area of projection of the diaphragm 166. As strongly implied by the elements 166 and 168 being termed "diaphragms," the free radial extents of the diaphragms 166 and 168 are flexible, that is the radially innermost portions of the diaphragms 166 and 168 are free to move axially in a flexible manner relative to their peripheral portions in response to pressure differentials existing across their free radial extents. It is preferred that the diaphragms 166 and 168 be metallic in construction and preferably also of somewhat resilient characteristic. In any event the diaphragms 166 and 168 when made of metal are of thin wall thickness and are flexible. It is also preferred that the flexibility of the free radial extents of the diaphragms 166 and 168 be of undulating radial configuration so as to enhance flexibility, it being understood that such undulations extend circumferentially about the axis of the diaphragms as is conventional in metallic bellows construction. Although only two undulations are illustrated with respect to the diaphragms 166 and 168, a substantially greater number of undulations is ordinarily preferred, it being appreciated that the illustrations thereof depict an exaggerated thickness of such diaphragms with a corresponding reduction in the illustrated number of undulations.

Although the spring 204 will normally retain the valve stem 154 in the valve closing position shown in FIGS. 4 and 6, it will be obvious that the imposition of a sufficiently great fluid pressure within the chamber 210 in relation to the pressure in the conduit 214 and in relation to the strength of the spring 204 and the closing bias thereof will exert a sufficient force upon the valve stem 154 through the action of the diaphragm 168 to cause opening movement, that is movement of the valve stem 154 to the right as shown in the drawings. This is for the reason that fluid pressure within the chamber 210 acts upon the diaphragm 168 in such a manner that the diaphragm 168 urges movement of the valve stem 154 to the right. Of course, in a similar manner fluid pressure in the chamber 210 acts upon the diaphragm 166 in a manner tending to cause closing, that is forward or movement of the valve stem 154 to the left as shown in the drawings; however, by virtue of the fact that the diaphragm 168 presents a greater effective area to the chamber 210 than does the 166, the net or differential effect of increasing pressure in the chamber 210 is to cause opening movement of the valve stem 154. The differential effect thus far described will occur even if the pressure within the sleeve 188 is equal to the pressure within the bore 126 or within the conduit 214. The differential effect described is even further enhanced when the pressure within the sleeve 188 is less than the pressure prevailing in the bore 126, as will be evident. Indeed, if the fluid to be valved by the valve 120 is continuously maintained under a substantially superatmospheric pressure in the conduit 214, and if the pressure within the sleeve 188 is continuously substantially atmospheric pressure, it would not even be necessary that the diaphragms 166 and 168 present differing effective areas to the chamber 210, it being understood that the bias of the spring 204 would be sufficient to maintain the valve closed against the action of fluid pressure in the conduit 214. While the valved fluid would normally be introduced to the valve 120 through the conduit 214, such is not necessarily the case as it may be desirable to introduce fluid through the conduit 150, and for this reason it is deemed preferable to not rely upon pressure of valved fluid to augment the valve opening action of fluid pressure within the chamber 210 and hence it is much preferred that the diaphragm 168 present a greater effective area to the chamber 210 than does the diaphragm 166.

The valve body 122 is provided with a pair of threaded ports 220 and 222 affording communication with the chamber 210 through registering openings 224 and 226 in the annular member 172, respectively. Control fluid pressure conduits 228 and 230 are respectively threaded in the ports 220 and 222 as shown. Although not so shown, if desired either one or the other of the threaded ports 220 and 222 can be closed by a plug (not shown) threaded thereinto.

The conduits 228 and 230 have communication with each other through the fluid pressure control chamber 210.

The desirability and advantages of providing for connection of the chamber 210 to two conduits will be readily appreciated upon reference to my previously mentioned original application, Ser. No. 566,996, in view of the following comments. A plurality of valves such as the valve 120 can be interposed at spaced positions along a single fluid pressure control conduit, in which event the illustrated portions of the conduits 228 and 230 may be deemed to be the adjacent ends of adjacent segments of such a fluid pressure control conduit. When employed in this manner, one of the ports 220 or 222 of a terminal valve 120 of the series is either closed by a plug or connected to a fluid pressure regulator means, either a bleeder or fluid pressure regulator. The other terminal valve 120 of such a series is similarly provided, as will be understood. Accordingly, the provision of two ports for the chamber 210 very substantially increases the utility of the valve 120 as compared to the utility thereof when only one such port is provided. This is not to say that the valve 120 would not be useful in the event only one port is provided, but that the utility is greatly extended by the provision of two ports.

As in the case of the previosuly described embodiment of the invention, means is provided for adjustably and positively limiting the extent to which the valve 120 can be opened. Such means comprises the valve body wall 202 being provided with an externally extending integral cylindrical boss 231 that is in alignment with the valve stem 154. An internally threaded opening 232 extends entirely through the boss 231 and the wall 202 in alignmetn with the valve stem 154, and an elongated threaded stop member 234 threadingly extends through the threaded opening 232. The stop member 234 has an end 236 disposed in the travel path of the valve stem 154 as will be evident upon inspection of FIG. 4. The other end of the elongated stop member 234 has a knurled knob 238 fixed thereto, whereby the threaded stop member 234 can be turned so as to adjustably position the end 236 thereof axially with respect to the valve body 122. In the preferred construction, the knurled knob 238 is provided with a sleeve or skirt 240 that extends toward the wall 202 and which rotatably embraces the cylindrical boss 231. As in the case of the previously described embodiment of the invention, the cylindrical boss 231 is provided with axially extending indicia 242, and the skirt 240 is provided with circumferentially extending indicia 244. It will be evident to those skilled in the art that the indicating means constituted of the indicia 242 and 244 enables very accurate indication of the axial position occupied by the end 236 of the stop member 234. It will be evident that the extent to which indicia 242 is exposed by the free end of the skirt 240 provides a crude indication of such position with interpellation between the crude increments indicated by the indicia 242 being provided by the indicia 244 registry with the indicia 242.

In the preferred construction, the valve body 122 is made either of steel or some alloy of copper such as brass or bronze. It is preferred that the O-rings be made of neoprene or any other suitable synthetic elastomeric resin compatible with the fluids with respect to which they are to be in contact. It is preferred that the diaphragms 166 and 168 be made of a stainless steel, or a resilient alloy of copper such as an alloy of copper and beryllium.

It is a special advantage of the valve 120 that the same is highly resistant to being rendered inoperative or unreliable in its valving function by the deposition of any gum-like material such as from the fluid being valved. This, of course, the result of the fact that movement of the valve stem 154 does not entail relative movement of closely fitting parts, excepting only the projecting end portion 156 of the valve stem 154. Even with respect to the small clearances afforded the valve stem portion 156, it will be noted that high fluid velocities will normally occur about the valve stem portion 156 so as to tend to preclude or remove any gum deposits at this position. In particular, the provision of the diaphragm 166 as a means for preventing fluid communication between the chamber 210 and the bore 126 does not entail relative movement of elements having close clearance. Thus, if, for example, the valve fluid is liquid aqueous ammonia having dissolved therein any substance such as fulfur having a gum forming tendency, any deposit of gum upon the diaphragm 166 or parts contiguous thereto will result in virtually no impairment of free axial movement of the valve stem 154.

Such function of the diaphragm 166 is, of course, in addition to the function thereof as well as of the diaphragm 168 in guiding and supporting axial movement of the valve stem 154.

It should be noted that it is not actually necessary that both of the two openings 224 and 226 be provided in the annular member 172 and that either of the openings 224 and 226 be in registry with the ports 220 and 222 for the reason that an annular groove 246 is provided about the periphery of the member 172. Therefore, the groove 246 communicates with both ports 220 and 222, and the groove 246 communicates through both of the openings 224 and 226 with the chamber 210. The provision of the groove 246 simplifies assembly of the valve because of there being no necessity for alignment.

I claim:

1. A fluid pressure controlled valve comprising a valve body having a generally L-shaped fluid passageway therethrough that is partially defined by an annular valve seat, said passageway being for valved flow of fluid therethrough, an elongated valve stem axially aligned with the valve seat and having one end adjacent the valve seat, said one end of the valve stem being provided with a valving element that is sealingly engageable with the valve seat positively to close the valve on movement of the valve stem in a forward direction toward said one end thereof to a predetermined position, said valving element including a tapered portion projecting into the valve seat whereby the passageway is progressively closed as the valve stem progressively moves toward said predetermined position, said body having a control fluid chamber therein, means including a first diaphragm connected to the valve stem for preventing fluid communication between the passageway and said chamber, means including a second diaphragm connected to the valve stem responsive to fluid pressure within the chamber to exert a force upon the valve stem urging movement thereof in a rearward direction with a force that increases in magnitude in response to an increase in pressure in the chamber, spring means yieldingly urging movement of the valve stem in said one direction to said predetermined position, said valve body having a port therein communicating with the chamber for enabling connection of the valve body to a fluid control pressure conduit, stop means disposed rearwardly of the rear end of the valve stem for positively limiting rearward movement of the valve stem, said stop means comprising an elongated stop member that is aligned with the valve stem and threadingly connected to the valve body for selective positioning thereof in the direction of its longitudinal extent relative to the valve body, said stop member having a first end disposed in the travel path of an end of the valve stem opposite said one end thereof, and said stop member having a second end exposed externally of the valve body, and micrometer means for indicating the longitudinal positioning of the stop member relative to the valve body.

2. The combination of claim 1, wherein the valve body includes a wall constituting a first spring abutment, said valve stem being radially enlarged at a position spaced from and intermediate the second diaphragm and said wall to constitute a second spring abutment, said spring means being compressively biased between the spring abutments, said wall being provided with an elongated and external boss that is aligned with the valve stem, said boss having a threaded opening therethrough, and said stop member being threaded through said threaded opening to constitute the threaded connection of the stop member to the valve body.

3. A fluid pressure controlled valve comprising a valve body having a generally L-shaped fluid passageway therethrough that is partially defined by an annular valve seat, said passageway being for valved flow of fluid therethrough, an elongated valve stem axially aligned with the valve seat and having one end adjacent the valve seat, said one end of the valve stem being provided with a valving element that is sealingly engageable with the valve seat to close the valve on movement of the valve stem in a forward direction toward said one end thereof to a predetermined position, said valving element including a tapered portion projecting into the valve seat whereby the passageway is progressively closed as the valve stem progressively moves toward said predetermined position, said body having a control fluid chamber therein, means for preventing fluid communication between the passageway and said chamber, means connected to the valve stem responsive to fluid pressure within the chamber to exert a force upon the valve stem urging movement thereof in a rearward direction with a force that increases in magnitude in response to an increase in pressure in the chamber, spring means yieldingly urging movement of the valve stem in said one direction, said valve body having a port therein communicating with the chamber for enabling connection of the valve body to a fluid control pressure conduit, stop means for positively limiting rearward movement of the valve stem, said stop means comprising an elongated stop member that is aligned with the valve stem and threadingly connected to the valve body for selective positioning thereof in the direction of its longitudinal extent relative to the valve body, said stop member having a first end disposed in the travel path of an end of the valve stem opposite said one end thereof, and said stop member having a second end exposed externally of the valve body, said valve body including a wall constituting a spring abutment against which said spring means is anchored, said wall being provided with an elongated and external boss that is aligned with the valve stem, said boss having a threaded opening therethrough, said stop member being threaded through said threaded opening to constitute the threaded connection of the stop member to the valve body, said boss being cylindrical and the second end of the stop member being provided with a cylindrical skirt that rotatably embraces a portion of the extent of the cylindrical boss, and means for indicating the position of the stop member comprising indicia circumferentially extending about the skirt and axially extending indicia along the boss.

4. A fluid pressure controlled valve comprising a valve body having a generally L-shaped fluid passageway therethrough that is partially defined by an annular valve seat, said passageway being for valved flow of fluid therethrough an elongated valve stem axially aligned with the valve seat and having one end adjacent the valve seat, said one end of the valve stem being provided with a valving element that is sealingly engageable with the valve seat positively to close the valve on movement of the vale stem in a forward direction toward said one end thereof to a predetermined position, said valving element including a tapered portion projecting into the valve seat whereby the passageway is progressively closed as the valve stem progressively moves toward said predetermined position, said body having a control fluid chamber therein, means including a first diaphragm connected to the valve stem for preventing fluid communication between the passageway and said chamber, means including a second diaphragm connected to the valve stem responsive to fluid pressure within the chamber to exert a force upon the valve stem urging movement thereof in a rearward direction with a force that increases in magnitude in response to an increase in pressure in the chamber, spring means yieldingly urging movement of the valve stem in said one direction to said predetermined position, said valve body having a port therein communicating with the chamber for enabling connection of the valve body to a fluid control pressure conduit, stop means disposed rearwardly of the rear end of the valve stem for positively limiting rearward movement of the valve stem, said valve extending through the second diaphragm with the end of the valve stem remote from said one end thereof being enlarged at a position spaced from the second diaphragm to constitute a first spring abutment facing in the rearward direction, said valve body including a wall constituting a second spring abutment facing the forward direction, and said spring means comprising a helical compression spring disposed between and seated against the spring abutments.

5. The combination of claim 4, wherein said wall is separable from the remainder of the valve body and is threadingly connected thereto, said abutments being provided with annular grooves in which the opposite ends of the spring are seated, and said stop means being carried by the wall and extending into the spring.

6. A fluid pressure controlled valve comprising a valve body having a generally L-shaped fluid passageway therethrough that is partially defined by an annular valve seat, said passageway being for valved flow of fluid therethrough, an elongated valve stem axially aligned with the valve seat and having one end adjacent the valve seat, said one end of the valve stem being provided with a valving element that is sealingly engageable with the valve seat positively to close the valve on movement of the valve stem in a forward direction toward said one end thereof to a predetermined position, said valving element including a tapered portion projecting into the valve seat whereby the passageway is progressively closed as the valve stem progressively moves toward said predetermined position, said body having a control fluid chamber therein, means including a first diaphragm connected to the valve stem for preventing fluid communication between the passageway and said chamber, means including a second diaphragm connected to the valve stem responsive to fluid pressure within the chamber to exert a force upon the valve stem urging movement thereof in a rearward direction with a force that increases in magnitude in response to an increase in pressure in the chamber, spring means yieldingly urging movement of the valve stem in said one direction to said predetermined position, said valve body having a port therein communicating with the chamber for enabling connection of the valve body to a fluid control pressure conduit, stop means disposed rearwardly of the rear end of the valve stem for positively limiting rearward movement of the valve stem, said stop means comprising the body having at its rear a threaded opening thereinto in axial alignment with the valve stem, and an elongated threaded member threaded through said threaded opening said threaded opening, said threaded member having an end disposed in the travel path of the valve stem for limiting rearward movement of the latter, and micrometer means for indicating the longitudinal position of the elongated member relative to the body.

7. A fluid pressure controlled valve comprising a valve body having a generally L-shaped fluid passageway therethrough that is partially defined by an annular valve seat, said passageway being for valved flow of fluid therethrough, an elongated valve stem axially aligned with the valve seat and having one end adjacent the valve seat, said one end of the valve stem being provided with a valving element that is sealingly engageable with the valve seat to close the valve on movement of the valve stem in a forward direction toward said one end thereof to a predetermined position, said valving element including a tapered portion projecting into the valve seat whereby the passageway is progressively closed as the valve stem progressively moves toward said predetermined position, said body having a control fluid chamber therein, means for preventing fluid communication between the passageway and said chamber, means connected to the valve stem responsive to fluid pressure within the chamber to exert a force upon the valve stem urging movement thereof in a rearward direction with a force that increases in magnitude in response to an increase in pressure in the chamber, spring means yieldingly urging movement of the valve stem in said one direction, said valve body having a port therein communicating with the chamber for enabling connection of the valve body to a fluid control pressure conduit, said means for preventing fluid communication between the passageway and the chamber comprising a movable diaphragm having a relatively movable central portion, said diaphragm separating the chamber and the passageway and having a periphery fixed sealingly to the valve body, said valve stem extending through the central portion and being in fixed sealing engagement therewith, said means connected to the valve stem responsive to fluid pressure within the chamber to exert a force upon the valve comprising a second diaphragm having a relatively movable central portion, said second diaphragm having a periphery fixed sealingly to the valve body to partially define said chamber, and the valve stem being fixed to the central portion of the second diaphragm, said first mentioned diaphragm and the second diaphragm respectively presenting relatively smaller and greater effective areas to the action of fluid pressure prevailing in the chamber, said valve stem extending through the second diaphragm and wherein the end of the valve stem remote from said one end thereof being enlarged to constitute a first spring abutment facing in the rearward direction, said valve body including a wall constituting a second spring abutment facing the forward direction, said spring means comprising a helical compression spring disposed between and seated against the spring abutments, said wall being provided with a cylindrical boss aligned with the valve stem and extending outwardly from the valve body, said wall and the boss having a threaded opening extending entirely therethrough in alignment with the valve stem, an elongated and threaded stop member threadingly extending through the threaded opening, said member having a first end disposed in the travel path of the valve stem and a second end, said second end of the stop member being provided with a skirt rotatably embracing the boss, indicia circumscribed about the skirt, and indicia extending axially along the boss.

References Cited

UNITED STATES PATENTS

| | | | |
|---|---|---|---|
| 2,911,005 | 11/1959 | Adelson | 137—596.15 |
| 1,122,638 | 12/1914 | Raymond | 251—61.5 |
| 2,273,535 | 2/1942 | Peo | 251—60 |
| 3,298,389 | 1/1967 | Freeman | 251—122 X |
| 3,334,654 | 8/1967 | Donner | 137—553 |

FOREIGN PATENTS 350,520   1/1961   Switzerland.

ARNOLD ROSENTHAL, Primary Examiner

U.S. Cl. X.R.

251—60, 61.5, 63, 122